John Tingley — Improved Churn

No. 74954

PATENTED FEB 25 1868

Witnesses: Wm. Albert Steel, John Parker

John Tingley
By his attorney
H. Howson

United States Patent Office.

JOHN TINGLEY, OF PHILADELPHIA, PENNSYLVANIA, ASSIGNOR TO PHILADELPHIA WOOD AND HOLLOW-WARE MANUFACTURING COMPANY.

Letters Patent No. 74,954, dated February 25, 1868.

IMPROVEMENT IN CHURNS.

The Schedule referred to in these Letters Patent and making part of the same.

TO ALL WHOM IT MAY CONCERN:

Be it known that I, JOHN TINGLEY, of Philadelphia, Pennsylvania, have invented an Improved Churn; and I do hereby declare the following to be a full, clear, and exact description of the same.

My invention consists of a vessel having trunnions adapted to bearings in a suitable frame, in combination with a perforated diaphragm and detachable cover, the whole being constructed and arranged substantially as described hereafter, for the purpose of thoroughly agitating the cream, and rapidly obtaining butter therefrom.

In order to enable others to make and use my invention, I will now proceed to describe its construction and operation, reference being had to the accompanying drawing, which forms a part of this specification, and in which—

Figure 1:
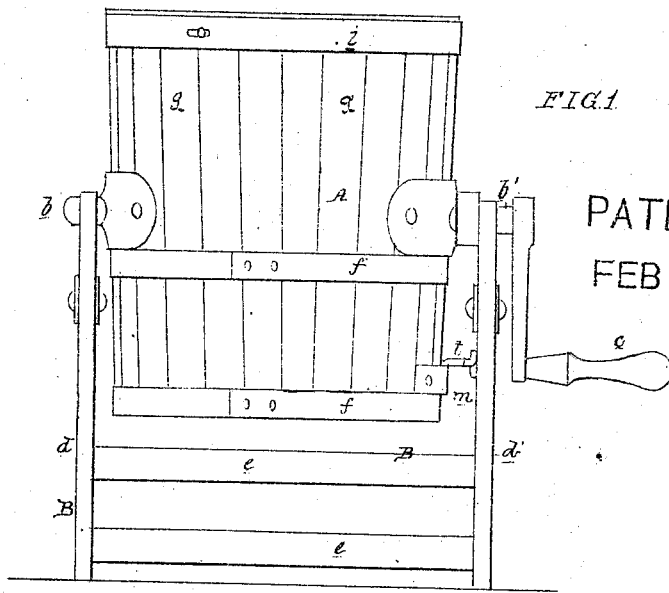

Figure 1 is a front elevation of my improved churn.

Figure 2:
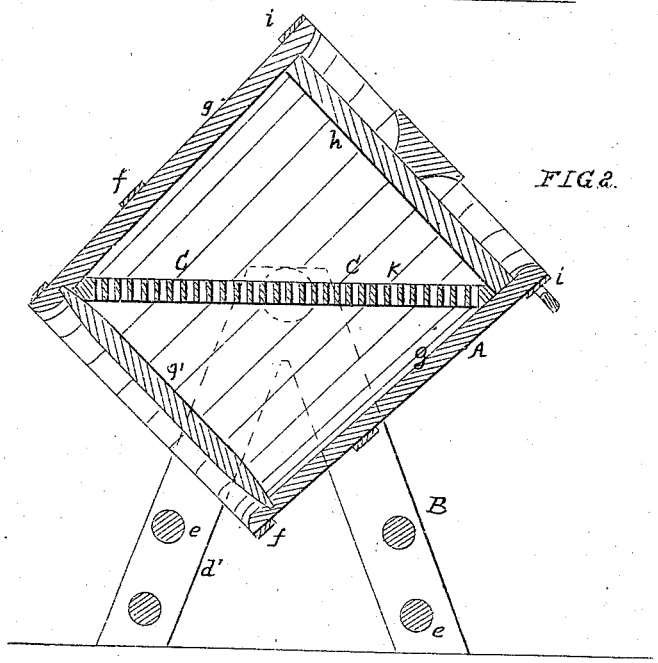

Figure 2, a vertical section of the same on the line 1–2, fig. 1; and

Figure 3:
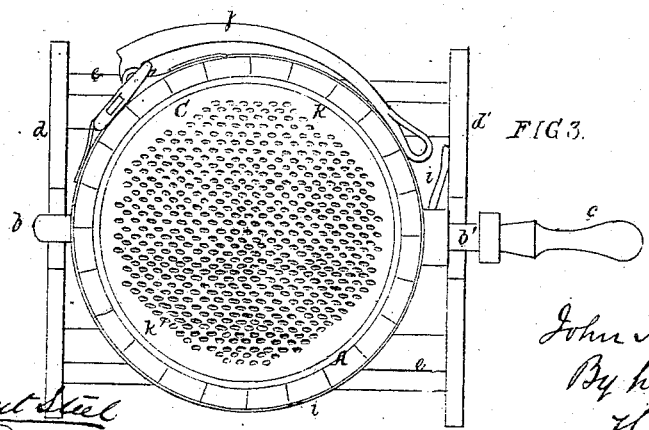

Figure 3, a plan view, with the end or head of the churn removed.

Similar letters refer to similar parts throughout the several views.

A is a wooden vessel, to the opposite sides of which, at a point about midway between the top and bottom, are secured journals or trunnions $b$ and $b'$, one of which is provided with a crank-handle, $c$, the trunnions turning in suitable bearings on the upper portion of the frame B, which consists, in the present instance, of the standards $d$ and $d'$, connected together by cross-bars $e$. The lower ends of the staves $g$ of the vessel are bound together by hoops $ff$, the bottom, $g'$, being secured in the usual manner. The cover $h$ of the vessel is detachable, and is secured in its position by a band, $i$, which has, at one end, a link, and at the other end a curved lever, $j$, the eccentric portion of which acts upon the link, and draws the opposite ends of the band $i$ together when the lever is moved inward to the position seen in fig. 3, thus tightening the staves, and effectually closing them against the edge of the cover $h$, as described in the patent granted to myself on the eleventh day of August, 1863.

A detachable partition or diaphragm, C, perforated with a number of small holes, $k$, extends diagonally across the vessel A, one end of the diaphragm fitting in the corner formed at the junction of the sides with the bottom of the vessel, and its opposite end resting in the corner formed by the cover and sides of the vessel.

The vessel A is in the first instance turned to the upright position shown in fig. 1, and is retained there by means of a hook, $l$, which is connected to one of the standards $d'$, and is adapted to a staple, $m$, on one side of the said vessel. The lever $j$ is first moved outward, the band $i$ loosened, and the cover $h$ removed. Then the cream is introduced into the vessel, and the cover is returned to its place, and there secured, after which the vessel is unhooked, and turned by means of the handle $c$.

As the churn revolves, the mass of cream will be projected from one end of the vessel to the other, and on to the diaphragm C, and forced in small streams through the perforations $k$ into the body of cream on the other side of the partition, the particles of cream thus being thoroughly agitated, and the collection of butter from the same rapidly effected, after which the band $i$ may be loosened, the cover detached, the diaphragm withdrawn, and the churn emptied of its contents, and cleansed preparatory to receiving a new supply of cream.

It will be seen that, as the diaphragm is arranged diagonally, the cream can flow freely from one end of the vessel to the other, and is therefore more thoroughly agitated than when a transverse diaphragm is used, while a diagonal diaphragm may be secured in its place without it being necessary to make recesses in or have projections on the interior of the churn, which can therefore be thoroughly cleaned, and can afford no lodgment to particles of dirt.

I claim as my invention, and desire to secure by Letters Patent—

The inclined diaphragm, arranged diagonally in the vessel, and held in place by the detachable cover $h$, all substantially as set forth.

In testimony whereof, I have signed my name to this specification in the presence of two subscribing witnesses.

JOHN TINGLEY.

Witnesses:
CHAS. E. FOSTER,
W. J. R. DELANY.